O. W. COWGILL.

SIGNAL FOR MOTOR VEHICLES.

APPLICATION FILED MAY 15, 1916.

Reissued Aug. 29, 1916.

14,186.

Inventor
Oph W. Cowgill
By Carr & Carr
his attorneys

UNITED STATES PATENT OFFICE.

ORPH W. COWGILL, OF ST. LOUIS, MISSOURI, ASSIGNOR OF NINETY ONE-HUNDREDTHS TO OTTO F. STIFEL, OF ST. LOUIS, MISSOURI.

SIGNAL FOR MOTOR-VEHICLES.

14,186. Specification of Reissued Letters Patent. Reissued Aug. 29, 1916.

Original No. 1,106,134, dated August 4, 1914, Serial No. 758,034, filed March 31, 1913. Application for reissue filed May 15, 1916. Serial No. 97,752.

*To all whom it may concern:*

Be it known that I, ORPH W. COWGILL, a citizen of the United States, residing at St. Louis, Missouri, have invented a certain new and useful Improvement in Signals for Motor-Vehicles, of which the following is a full, clear, and exact description, such as will enable others skilled in the art to which it appertains to make and use the same, reference being had to the accompanying drawings, forming part of this specification, in which—

Figure 1:
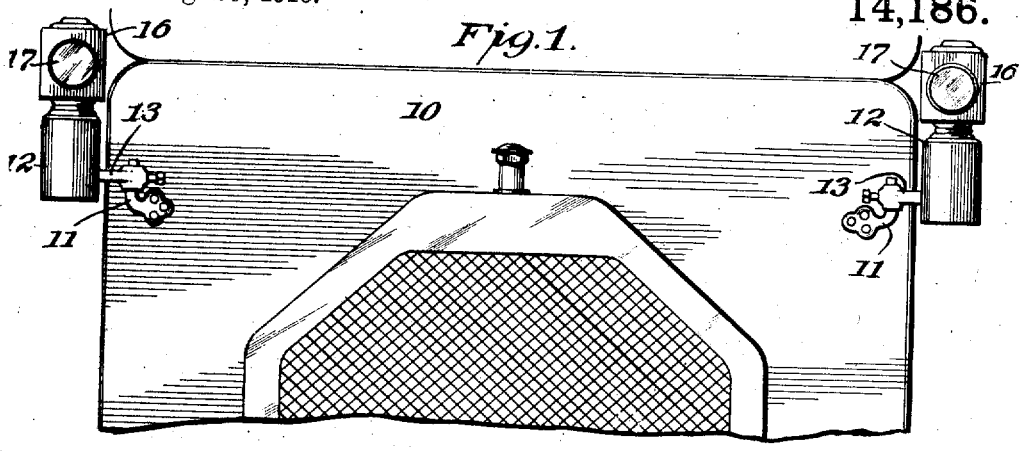
Figure 3:
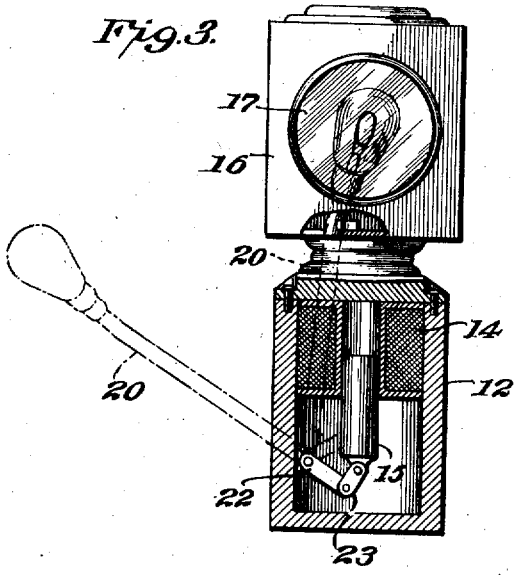
Figure 2:
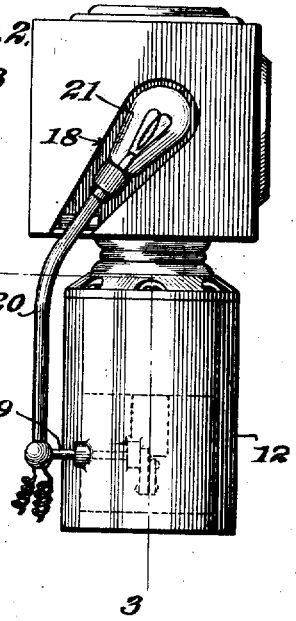
Figure 4:
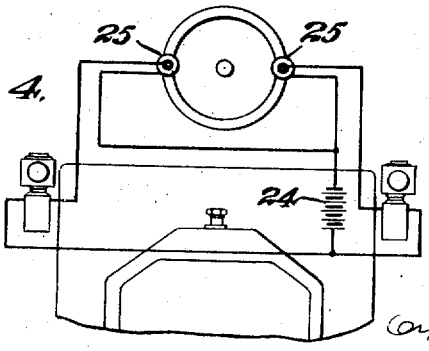

Figure 1 is a front elevational view of a portion of a motor vehicle, and showing my improved signaling devices attached to the dash thereof. Fig. 2 is a side elevational view of a signaling device of my improved construction. Fig. 3 is a side elevational view partly in section, said view being taken approximately on the line 3—3 of Fig. 2. Fig. 4 is a diagrammatic view illustrating the electrical connections between the signaling devices on the front of a vehicle and the switches, which latter are preferably located on the steering wheel of the vehicle.

My invention relates to new and useful improvements in electrically operated signaling devices which are combined with the side lights of a motor vehicle, and which signaling devices are adapted to be used for indicating the direction in which the driver of the vehicle is going to turn.

The principal object of my invention is to provide a signaling device in the form of an electrically operated semaphore which carries an electric lamp, and which latter is normally located in the side light housing usually positioned on the end of the dash of the vehicle.

My improved signaling device is adapted for both day and night use, for the semaphore arm forming a part of the signal is readily visible in day time as it swings outwardly from the end of the dash of the vehicle, and the electric lamp carried by said semaphone is, of course, visible at night.

A further object of my invention is to provide a comparatively simple, inexpensive construction which can be readily applied to all forms of motor vehicles without changing or modifying the construction thereof, and which device is electrically operated and controlled by means of switches located upon or near the steering wheel of the vehicle.

To the above purposes my invention consists in certain novel features of construction and arrangement of parts hereinafter more fully described and claimed.

Referring by numerals to the accompanying drawings 10 designates the dash of a motor vehicle, and located on the ends thereof are suitable brackets 11 which support the signaling devices. Each signaling device comprises a housing 12 provided with a bracket 13 which is adapted to be removably applied to the bracket 11, and arranged in the upper portion of this housing is an ordinary solenoid comprising a coil 14 and core 15.

The chamber for passage way through the core 14 is closed at its upper end, thus providing means for the formation of an air cushion in said chamber above the core in order to cushion or retard the sudden upward movement of the core when the coil is energized. There is sufficient clearance between the core and the wall of the chamber in the coil to permit the air above the core to gradually discharge from said chamber as the core is drawn upward.

Located on top of the housing 12 is the ordinary side light housing 16 provided with the usual glazed opening 17 in its front wall; and with an opening 18 in its outside wall.

Journaled in the lower portion of the housing 12 is a short, horizontally disposed shaft 19, and fixed thereto is the lower end of a tubular arm 20 which performs the function of a semaphore, and carried by the upper end of this arm is an electric lamp 21. The arm 20 is shaped so that when it occupies a normal or upright position the upper portion thereof and the lamp positioned on its upper end are located within the housing 16 so that the rays from the lamp when lighted will pass through the glazed opening 17.

Fixed to the end of the shaft 19 within the housing 12 is one end of a short, crank arm 22, and pivotally connected to the opposite end thereof is one end of a short link 23, the opposite end of which is pivotally connected to the lower end of a solenoid core 15.

The electric circuits in which the solenoid coils 14 are located have a common battery 24 suitably located in the vehicle, and said circuits are controlled by means of switches such as push buttons located on the right and left hand points of the steering wheel, or at points convenient to the hand of the vehicle driver.

It will be understood that the switch or push button on the right hand side of the steering wheel controls the solenoid of the signaling device on the right hand end of the dash, and the switch or push button on the left hand side of the wheel controls the solenoid on the left hand end of the dash.

The electrical connections are clearly illustrated in Fig. 4.

The semaphore arms 20 are preferably hollow in order to accommodate electric wires leading to the lamps 21.

The operation of my improved signaling device is as follows: When the driver of the vehicle desires to turn laterally in either direction the switch or push button on the side corresponding to the direction in which the vehicle is to turn is closed, thereby energizing the corresponding coil 14, which action draws the corresponding core 15 upward, this movement of said core being cushioned by the air in the upper end of the chamber within the coil. As the core is thus drawn upward the shaft 19 is rocked by reason of the connections 22 and 23, thereby moving the corresponding semaphone arm 20 outward and downward to the position shown by dotted lines in Fig. 3, and thus the signal is given that the driver is about to turn the vehicle in the direction indicated by the exposed or dropped semaphore arm. When the switch or push button is released to open the circuit, the weight of the core moving downward to its normal position restores the semaphore arm to its upright normal position with the lamp 21 within the housing 16. A suitable resilient buffer, preferably of rubber, is located in the bottom of the housing 16 in position to bear against the upper portion of the semaphore 20 when the same returns to its normal upright position, thus overcoming any tendency of said semaphore to vibrate after movement.

A signaling device of my improved construction is comparatively simple, is positive in action, can be readily applied to any ordinary motor vehicle without altering or modifying the structure thereof, is visible both day and night, and the electric lamps carried by the upper ends of the semaphore arms form side lights which are an essential feature to motor vehicles.

Various slight changes and modifications may be made in the general form and parts of my improved device without departing from the spirit of my invention, the scope of which is set forth in the appended claims.

I claim:

1. The combination with a vehicle, of a side light housing on said vehicle, an electrically operated semaphore arm arranged for operation adjacent to said light housing, and a lamp carried by said semaphore arm, which lamp normally occupies the side light housing.

2. The combination with a vehicle, of a side light housing, a semaphore arm moulted for operation upon the vehicle adjacent to said housing, a lamp carried by said semaphore arm, which lamp normally occupies said light housing, and electrically operated means for actuating the semaphore arm.

3. The combination with a vehicle side light housing, of an electrically controlled semaphore arranged for operation adjacent to said housing, and a lamp carried by said semaphore arm, which lamp is normally positioned in said housing.

4. The combination with a vehicle lamp housing, of a solenoid adjacent to said lamp housing, a semaphore actuated by said solenoid, and a lamp carried by said semaphore, which lamp is normally located in said housing.

5. A signaling device for motor vehicles comprising a lamp housing adapted to be positioned upon the vehicle, a pivotally mounted semaphore, an electric lamp carried thereby, which lamp normally occupies the lamp housing, and an electrically operated means including a solenoid for actuating said semaphore.

6. The combination with a vehicle side light housing, of a housing located below the light housing, a solenoid within the second mentioned housing, a semaphore pivotally mounted on the second mentioned housing and connected to the core of the solenoid, and an electric lamp carried by said semaphore, which lamp is normally located within the light housing.

7. The combination with a vehicle, of lamp housings located on opposite sides of said vehicle, a semaphore arm arranged for operation adjacent to each housing, a lamp carried by each semaphore arm, which lamp normally occupies the corresponding housing, and electrically operated means including switches for actuating either one of the semaphore arms.

8. A signaling device for motor vehicles comprising a side lamp bracket, a semaphore pivotally mounted thereon, an electric lamp carried thereby and arranged to be visible from front to rear, said lamp constituting a side lamp for the vehicle, and an electrically operated means for actuating said semaphore to swing said lamp laterally out from said vehicle.

9. A signaling device for motor vehicles comprising a bracket located at the side of the vehicle, a semaphore pivotally mounted on said bracket to swing outwardly, said semaphore standing normally in upright position, a lamp carried at the upper end of said semaphore, means carried by said bracket for oscillating said semaphore and lamp away from said vehicle, and electrical means controlled from the vehicle for actuating said oscillating means.

10. The combination with a side lamp bracket for a vehicle, of a solenoid carried thereby, a semaphore pivoted to swing outwardly from said bracket and actuated by said solenoid, and a lamp carried by said semaphore, which lamp is normally located above said bracket to constitute a side lamp for the vehicle.

In testimony whereof I hereunto affix my signature in the presence of two witnesses, this thirteenth day of May, 1916.

ORPH W. COWGILL.

Witnesses:
ANDREW P. KESSLING,
EDGAR T. FARMER.